United States Patent [19]

St. Jean et al.

[11] 4,301,893
[45] Nov. 24, 1981

[54] LANTERN RINGS

[76] Inventors: Richard P. St. Jean; Patricia M. St. Jean, both of P.O. Box 145, Floyd Knobs, Ind. 47119

[21] Appl. No.: 61,459

[22] Filed: Jul. 27, 1979

[51] Int. Cl.³ .............................................. F16N 1/00
[52] U.S. Cl. ...................................... 184/24; 277/105; 277/135
[58] Field of Search .................. 184/24; 415/111, 110; 277/3, 27, 59, 135, 105, 102

[56] References Cited

U.S. PATENT DOCUMENTS

| | | | |
|---|---|---|---|
| 722,219 | 3/1903 | Fielden | 277/60 |
| 834,984 | 11/1906 | Juhler | 277/105 |
| 990,587 | 4/1911 | Potts et al. | 277/105 |
| 2,486,939 | 11/1949 | Freund | 277/105 X |
| 2,534,530 | 12/1950 | Perry et al. | 277/105 X |
| 3,521,890 | 7/1970 | Holmes et al. | 277/59 X |
| 3,834,715 | 9/1974 | Butler | 277/59 X |
| 3,907,307 | 9/1975 | Maurer et al. | 277/69 |
| 4,065,136 | 12/1977 | Miller et al. | 277/27 X |
| 4,189,157 | 2/1980 | Mahan et al. | 277/27 X |
| 4,222,575 | 9/1980 | Sekiguchi et al. | 277/59 |

FOREIGN PATENT DOCUMENTS 249415 3/1926 United Kingdom .
408870 4/1934 United Kingdom .

Primary Examiner—David H. Brown

Attorney, Agent, or Firm—Edward M. Steutermann

[57] ABSTRACT

The present invention is directed to a lantern ring arrangement for use in fluid seal arrangements, to prevent fluid leaking around rotating shafts including a ring having first and second spaced sides with first and second ring openings respectively provided therein, an inner peripheral surface and outer peripheral surface with first and second flange means of generally equal length extending radially outwardly from and around a portion of the periphery of the outer surface of the ring in spaced relation along the longitudinal axis of the ring; first groove means of selected width and depth are provided around the inner surface of the ring means adjacent the first opening to the ring where the first opening diameter is selected to receive a shaft rotatable therein; radially inwardly extending flange means of selected depth located within said ring adjacent the inner edge of the first groove means and extending around a portion of the inner periphery of the ring to define a central opening in said ring of diameter less than the diameter of the first opening and adapted to rotatably receive the shaft where the inner diameter of the ring between the flange and the second opening of the ring is greater than the diameter of the central opening; first aperture means chamber and the groove means and second aperture means communicating with the inner surface of the ring means between the flange means and the second opening.

7 Claims, 2 Drawing Figures

LANTERN RINGS

BACKGROUND OF THE INVENTION

In various apparatus, for example pumps, blowers, mixers, or other processing equipment where a rotatable shaft is provided with associated impellers to move a fluid, it is necessary to provide shaft seals to prevent leakage of the fluid from around the moving member. Seals are particularly necessary when the device handles expensive or hazardous fluids or where the fluid is processed at elevated pressure.

Three common seal arrangements are generally utilized, as known in the art, including stuffing boxes, mechanical seals and labyrinths. None of the devices completely prevents leakage but are effective to minimize or control leakage. In other arrangements where leakage of the fluid in process cannot be tolerated an innocuous fluid can be provided to the seal to flow into the process.

The present invention while useful in some degree in all of the aforementioned sealing arrangements is particularly useful in stuffing boxes which provide a seal around a rotating shaft or in some cases a reciprocating shaft. The stuffing box is, generally, a chamber located in a stationary member that surrounds the shaft. An annular space is provided between the shaft and the wall of the chamber through which the shaft passes, and the annular space is adapted to receive packing which can include rope or rings of inert material such as, for example, asbestos containing a lubricant like graphite. The packing, when compressed tightly around the shaft, discourages fluid passage through the stuffing box and yet permits the shaft to turn or reciprocate. In many applications, the packing is maintained in sealing relation by a follower ring, or gland, progressively pressed into the box by a flanged cap or packing nut as the packing wears to maintain a desired compression of the packing. The shaft must have a smooth surface so that it does not wear away the packing; even so the pressure of the packing considerably increases the force required to rotate the shaft or otherwise move the shaft. A stuffing box even under ideal conditions, does not stop fluid from leaking out and, in fact, proper operation of the stuffing box is in many instances facilitated by a small amount of leakage through the stuffing box, particularly where the fluid which is allowed to leak, whether it is the fluid in the process which is allowed to leak out or a fluid purposely introduced to the stuffing box to leak into the process, is a good lubricant.

In applications where it is desirable to prevent any loss of fluid, and innocuous fluid is to be introduced to the stuffing box, a lantern gland can be used advantageously in the stuffing box. Usually, a lantern gland is a ring adapted to receive the shaft where the lantern gland/shaft assembly is received in the chamber of the stuffing box with packing on either side of the lantern gland. In some previous arrangements, the lantern ring has been of "H" shape in cross section with holes drilled through the bar of the "H" in a direction perpendicular to the axis of the shaft where the inner periphery of the ring receives the shaft and the outer periphery of the ring engages the inner surface of the stuffing box. The wall of the chamber of the stuffing box carries a conduit which takes fluid to or from the lantern ring. For example, an innocuous fluid can be supplied to the lantern ring to flow both ways along the shaft from the lantern ring and through the packing. Alternatively, in some applications, a vacuum is applied to the stuffing box conduit to remove fluid flowing to the lantern ring.

A lantern ring is also used to provide access for a fluid to be used to flush abrasive particles forward from the stuffing box into the process to prevent the particles from reaching the packing where they would destroy the packing and/or damage the shaft. The fluid introduced by means of a lantern ring is also useful to cool the shaft and packing during operation of the device associated with the shaft.

In present lantern rings as previously described and shown in U.S. Pat. No. 1,830,286 Moore where the fluid introduced to the lantern gland flows through the holes in the bar of the ring and thence both inwardly and outwardly from the lantern ring so that some fluid flushes forward to prevent entry of process fluid and abrasive particles into the stuffing box and some fluid flows rearward and is lost out the rear of the stuffing box. The fluid is generally supplied to the lantern gland at an elevated pressure so that the fluid lost from the rear of the stuffing box represents a loss of the value of the fluid as well as a loss of the energy required to supply the fluid to the lantern ring. Heretofore to attempt to minimize this loss, the packing nut or follower has been tightened to the greatest extent possible while still permitting acceptable operation. However, the greater compression of the packing naturally results in greater frictional heat generation and increased probability of damage to the shaft and packing.

No lantern ring has heretofore been provided to maximize fluid flow in one direction from the lantern ring while selectively reducing the rate of fluid flow from the ring along the shaft in an opposite direction, without excessive compression of the packing.

SUMMARY OF THE INVENTION

The present invention provides a lantern ring for use, for example, in a stuffing box where means are provided to selectively direct the flow of fluid admitted to the lantern ring chamber predominantly in one selected direction along the shaft.

Additionally, use of lantern rings in accordance with the present invention significantly reduces the total quantity of flush fluid required for satisfactory performance of the stuffing box because of the reduced flow rate in one direction and in most instances allows a reduction in the compression of the packing thereby reducing heat buildup and probability of scoring or damage to the shaft. The effective life of the packing is thereby increased.

The present invention also provides an arrangement useful where the principle purpose of the lantern gland is to provide cooling for the packing, and where it is desirable to minimize the quantity of liquid introduced to the process either because of the nature of the fluid in process or simply because addition of more fluid to the process simply increases the amount of fluid to be treated later wherein the principle flow of fluid is directed from the lantern gland along the shaft and to the atmosphere.

Briefly, the present invention is directed to a lantern ring arrangement for use in fluid seal arrangement, including stuffing boxes utilized in preventing fluid leakage around rotating shafts. Lantern rings provided by the present invention include generally a ring having first and second spaced sides with first and second central openings therein, respectively, and an inner peripheral surface and an outer peripheral surface where the ring is adapted to be received in a cylindrical chamber with its longitudinal axis parallel to the longitudinal axis of the cylinder; first and second flange means of generally equal length extending radially outwardly from and around a portion of the periphery of the outer surface of the ring in spaced relation along the longitudinal axis of the ring so the outer periphery of the first and second flange means engage the inner surface of the cylindrical chamber so that a first ring-shaped chamber is defined around a portion of the outside of the ring between the outer surface of the ring, the inner surface of the cylinder and the first and second flange means, first inner peripheral groove means of selected width having a maximum diameter greater than the diameter of the first ring opening provided around the inner surface of the ring means adjacent the first opening to the ring where the first opening diameter is selected to receive a shaft rotatable therein; radially inwardly extending flange means of selected depth located within said ring adjacent the inner edge of said first groove means and extending around a portion of the inner periphery of the ring to define a central opening in said ring of diameter less than the diameter of the first opening and adapted to rotatably receive the shaft where the inner diameter of the ring between the flange and the second opening of the ring is greater than the diameter of the opening defined by the flange which is also adapted to rotatably receive the shaft; first aperture means communicating with the first chamber and the groove means and second aperture means communicating with the first chamber and the inner surface of the ring means between the flange means and the second side.

It will be recognized that other arrangements in accordance with the present invention will become obvious to those skilled in the art upon reading the disclosure set forth hereinafter.

BRIEF DESCRIPTION OF THE DRAWINGS

Referring now to the drawings which depict one example of an arrangement within the scope of the present invention.

Figure 2:
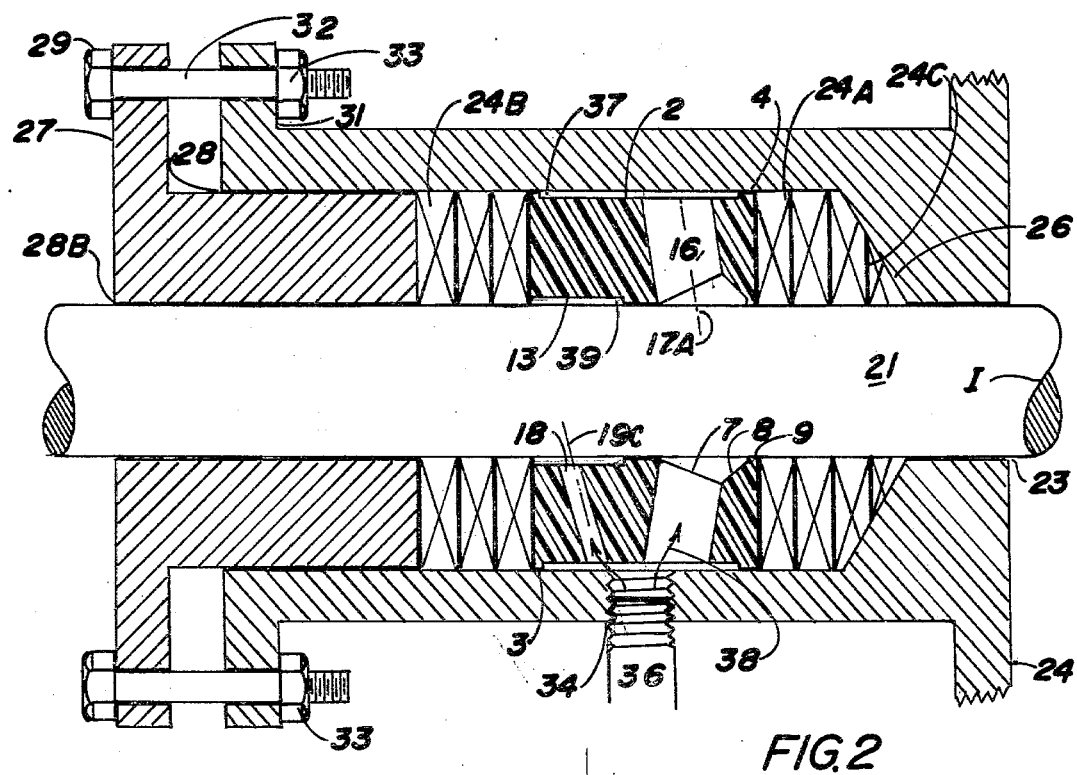
FIG. 2 is a sectional view of a stuffing box illustrating an application of the lantern ring shown in FIG. 1.
Figure 1:
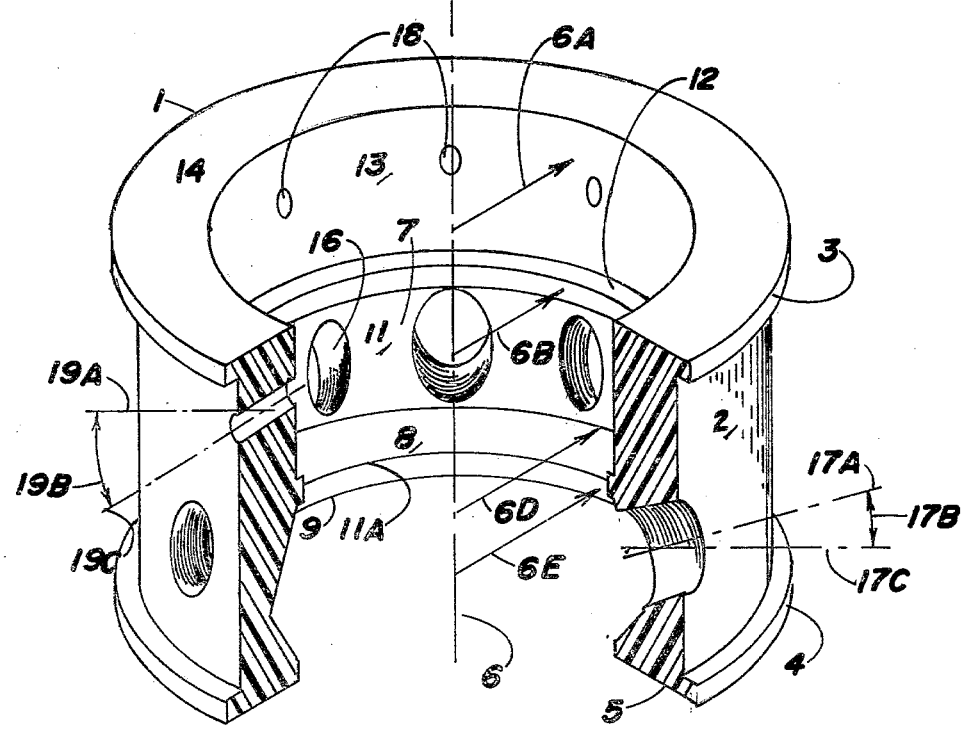
FIG. 1 is a perspective view, partially in section of one example of a lantern ring in accordance with the present invention.

Referring first to FIGS. 1 and 2, lantern ring 1, for example of plastic or metal, is principally defined by a cylindrical wall 2 where flanges 3 and 4 are provided to extend radially outwardly from wall 2, a generally equal and selected distance in spaced relation along wall 2 to define a cylindrical channel.

Considering next the inner wall of ring 1, a groove 11 is cut in the inner wall adjacent a first side 5 of ring 1 and is defined by outwardly slanted walls 7 and 8 which intersect at a "V" shaped line of intersection 11A where the radius of the groove is represented by arrow 6D. One opening to ring 1 is defined by a lip 9 advantageously provided at side 5 as shown. With reference to a longitudinal centerline 6 the internal radius of lip 9 is represented by line 6E.

At the innermost edge of wall 7, an inwardly directed flange 12 is provided to extend inwardly into ring 1 a selected distance, as shown, where the inner radius of flange 12 is represented by radius line 6B. Radius 6B in most applications is the smallest of all radii and provides minimal clearance with the shaft associated with the ring.

As shown in FIG. 1, an inner wall segment 13 of radius 6A greater than radius 6B is provided in the portion of ring 1 between flange 12 and the second side 14 of ring 1.

In accordance with the present invention, apertures 16 having a selected diameter are provided in spaced relation around ring 1 to communicate with the surface of wall 2 and the groove defined by wall members 7 and 8 where each aperture 16 has an axis 17A at a selected angle 17B relative to a transverse axis 17C of ring 1 so that, advantageously, the axis 17A of each aperture 16 is directed toward side 5 of ring 1.

Likewise, apertures 18 having selected diameter are provided in spaced relation around ring 1 to communicate with surface 13 where the axis 19C of each aperture is disposed at a selected angle 19B with respect to a transverse axis 19A of ring 1.

Referring now to FIGS. 1 and 2 which illustrates an example of an application of ring 1 in a cylindrical stuffing box 22, the stuffing box is adapted to provide a seal for a shaft 21 which extends through a wall 24, for example a pump casing, where end I of shaft 21 is connected to an impeller, or when wall 24 is the wall of a tank end I of shaft 21 can be connected to a mixer blade.

Shaft 21 extends through the length of stuffing box 22 and through aperture 23 of wall 24. Shaft 21 is received by ring 1, as shown, where ring 1 is disposed in the chamber defined by stuffing box 22 where the diameter of flanges 3 and 4 has been selected so the flanges loosely engage the inner surface of stuffing box 22. As shown, ring 1 is located approximately at the center of the longitudinal axis of stuffing box 22 and inboard packing rings 24A are provided in continuous relation between ring 1 and a tapered endwall 26 of stuffing box 22 while outboard packing rings 24B are provided between ring 1 and the outside of stuffing box 22.

It will be noted that in the example shown, compression of the packing urges the innermost packing ring 24C to contact with tapered wall 26 of stuffing box 22 thereby urging the ring radially inwardly toward shaft 21. Advantageously, lantern rings in accordance with the present invention permit seal operation at reduced packing compression thereby permitting reduction of the lateral force on the rotating member in arrangements as shown in FIG. 2.

In the example shown, a follower 27 is provided having a cooperative aperture 28A to rotatably receive shaft 21. Follower 27 is adapted to be received in an open end 28 of stuffing box 22 for longitudinal movement therein so the innermost end of follower 27 engages and compresses packing rings 24A and 24B by moving rings 24B longitudinally along shaft 21.

Follower 27 is provided with an apertured flange 29 adapted to mate with openings of a flange 31 of stuffing box 22 where fasteners, for example bolts and nuts 32 and 33 are provided so that takeup of nuts 33 urges follower 27 to compress packing rings 24A and 24B.

A fluid inlet means, for example, a threaded opening 34 is provided in the sidewall of stuffing box 22 with a conduit 36 attached thereto in communicative relation, for example, by cooperative threads, for admission of a selected fluid stream 38 to an annular chamber 37 defined between flanges 3 and 4, the inside wall of stuffing box 22 and surface of wall 2 of ring 1. The fluid flows from chamber 37 through conduits 18 to the annular chamber 39 defined between surface 13 of ring 1 and the outer surface of shaft 21 to the outboard packing rings 24B. Likewise, the fluid flows through conduits 16 to the annular chamber defined between sidewalls 7 and 8 and the surface of shaft 21 and leaks to inboard packing rings 24A through the annular space between lip 9 and shaft 21.

While not always necessary, it is in some applications useful if conduits 16 and 18 are inclined relative to the transverse axis of ring 1 in the respective direction of flow of the fluid streams so that the fluid is properly directed on emission from the respective conduits to reduce fluid turbulence and provide greater reliability and flow rate control.

Additionally, walls 7 and 8 are inclined to provide a "V" shaped sidewall advantageously configured, as shown, to permit the fluid stream to be directed toward the annular opening between lip 9 and shaft 21 so both the kinetic and static energy of the fluid stream are useful in providing a desirable uniform leak rate through the openings. In accordance with another feature of the present invention, the diameter of apertures 16 and 18 to deliver fluid to packing 24A and 24B can be sized in relation to the relative ratio of fluid flow desired in each direction, for example a ratio of 3 to 1.

In the example shown, the diameter of conduits 16 is greater than the diameter of conduits 18 to provide greater fluid flow to packing 24A. It will be recognized that the relative flow rates are also dependent on the relative clearances between lip 9 and surface 13 and shaft 21.

It will be recognized that in the example shown in FIG. 2, ring 1 is disposed to provide primary fluid flow to packing rings 24A and the structure of which wall 24 is a part. It will be recognized that by reversing ring 1, primary flow can be directed to packing rings 24B and to the atmosphere through follower 27.

As previously discussed and in accordance with another feature of the present invention, the relative flows of fluid are also determined by the relative clearance between lip 9 and surface 13 and shaft 21. Also the internal diameter of flange 12 is minimized as much as possible to reduce fluid flow past the flange to assure the desired relative fluid flow from each end of ring 1.

It will be recognized that other arrangements within the scope of the present invention will occur to those skilled in the art upon reading the disclosure set forth hereinafter.

We claim:

1. A lantern ring for use in a cylinder adapted to receive a shaft where the shaft is adapted for movement within the cylinder and is located in spaced relation from the sidewalls thereof with its longitudinal axis parallel to the longitudinal axis of the cylinder to define an annular packing chamber within the cylinder where the lantern ring is received within the cylinder and includes:

(a) a ring having an outer surface an inner surface and first and second axially spaced sidewalls of selected outer diameter less than the internal diameter of the cylinder, said inner surface having a diameter greater than the outer diameter of the shaft and adapted to receive the shaft to maintain the ring in aligned relation on the shaft where first groove means of selected diameter is provided; the inner surface of the ring adjacent the first side wall with a radially inwardly projecting lip of selected diameter greater than the diameter of said shaft less than the diameter of said inner surface provided between said groove and said first sidewall defining a first opening to said ring;

(b) first and second flange means of equal length extending in spaced parallel relation, radially outwardly from, and around a portion of the outer surface of the ring so a portion of the outer periphery of the first and second flange means engages the inner surface of the cylinder so that a first annular chamber is defined by the first and second flange means, the inner surface of the cylinder and the outer surface of the ring;

(c) inwardly radially extending internal flange means of selected depth located within said ring means between the inner most edge of said first groove means and said second sidewall, and extending around a portion of the inner periphery of the ring to define a central opening in said ring of diameter greater than the diameter of said shaft and less than the diameter of said inner surface and adapted to receive said shaft;

(d) at least one first conduit means communicating with said groove means and said first annular chamber for fluid flow therebetween;

(e) at least one second conduit means communicating with said first annular chamber and the portion of the inner surface of said ring means between said internal flange means and said second side wall.

2. The invention of claim 1 wherein the diameter of said first conduit is greater than the diameter of said second conduit.

3. The invention of claim 1 wherein said first conduit means extends along an axis at an acute angle relative to a transverse plane of the ring toward the first side of the ring.

4. The invention of claim 1 wherein the second conduit extends through said ring from the first annular chamber to the inner surface of the ring between said internal flange means and said second conduit extends along an axis at an acute angle relative to a transverse axis of said ring toward said second sidewall.

5. The invention of claim 1 wherein the diameter of said central opening is less than the diameter of said first opening.

6. The invention of claim 1 wherein the groove means is of "V" shaped cross section.

7. The invention of claim 1 wherein the diameter of said central opening is less than the diameter of the inner surface of said ring between said internal flange means and said second side.

* * * * *